US005770673A

United States Patent [19]
Markusch et al.

[11] Patent Number: 5,770,673
[45] Date of Patent: Jun. 23, 1998

[54] NON-SAGGING, LIGHT STABLE POLYURETHANE COMPOSITIONS, A PROCESS FOR PRODUCING THEM, AND THEIR USE AS SEAM SEALANTS

[75] Inventors: Peter H. Markusch, McMurray, Pa.; Robert L. Cline, Paden City, W. Va.; A. M. Sarpeshkar, Upper St. Clair, Pa.

[73] Assignee: Bayer Corporation, Pittsburgh, Pa.

[21] Appl. No.: 630,660

[22] Filed: Apr. 10, 1996

[51] Int. Cl.⁶ .................................................. C08G 18/48
[52] U.S. Cl. ............................... 528/61; 528/60; 528/66; 528/76; 525/410
[58] Field of Search .................................. 528/60, 61, 66, 528/76

[56] References Cited

U.S. PATENT DOCUMENTS

| | | | |
|---|---|---|---|
| 3,714,127 | 1/1973 | Fabris et al. | 260/77.5 AM |
| 3,979,364 | 9/1976 | Rowton | 260/77.5 AM |
| 4,552,934 | 11/1985 | Rabito et al. | 525/458 |
| 4,695,618 | 9/1987 | Mowrer | 528/55 |
| 4,732,957 | 3/1988 | Schuster et al. | 528/58 |
| 4,743,672 | 5/1988 | Goel | 528/44 |
| 4,869,400 | 9/1989 | Jacobs | 222/137 |
| 4,954,199 | 9/1990 | Rains et al. | 156/331.7 |
| 4,994,540 | 2/1991 | Boerner et al. | 528/44 |
| 5,049,638 | 9/1991 | Matsumoto et al. | 528/61 |
| 5,059,672 | 10/1991 | Engebretson | 528/64 |
| 5,102,714 | 4/1992 | Mobley et al. | 428/95 |
| 5,106,874 | 4/1992 | Porter et al. | 528/64 |
| 5,164,473 | 11/1992 | Dormish et al. | 528/44 |
| 5,166,303 | 11/1992 | Markusch et al. | 528/76 |
| 5,204,439 | 4/1993 | Dormish et al. | 528/44 |
| 5,227,409 | 7/1993 | Mobley et al. | 521/167 |
| 5,254,662 | 10/1993 | Szycher | 528/67 |

*Primary Examiner*—Ralph H. Dean
*Attorney, Agent, or Firm*—Joseph C. Gil; N. Denise Brown

[57] ABSTRACT

The present invention relates to non-sagging, light stable polyurethane compositions. These non-sagging, light stable polyurethane compositions are the reaction product of a liquid hexamethylene diisocyanate adduct with a mixture of an organic compound containing hydroxyl groups, an aliphatic and/or alicyclic diamine, and an alkanolamine. It also relates to a process for producing these non-sagging, light stable compositions, and their use as seam sealants.

11 Claims, No Drawings

NON-SAGGING, LIGHT STABLE POLYURETHANE COMPOSITIONS, A PROCESS FOR PRODUCING THEM, AND THEIR USE AS SEAM SEALANTS

BACKGROUND OF THE INVENTION

This invention relates to non-sagging, light stable polyurethane compositions. These polyurethane compositions comprise the reaction product of a liquid hexamethylene diisocyanate adduct and an isocyanate-reactive component comprising an organic compound containing hydroxyl groups, an aliphatic and/or alicyclic diamine, and an alkanolamine. This invention also relates to a process for the preparation of these non-sagging light stable polyurethane compositions, and the use of these non-sagging light stable compositions as seam sealants, i.e. in carpet installations.

Polyurethane adhesive compositions are known and described in, for example, U.S. Pat. Nos. 3,714,127, 3,979,364, 4,552,934, 4,743,672, 4,954,199, 4,994,540, 5,059,672, 5,102,714, 5,164,473, 5,166,303, 5,204,439, 5,227,409. Of these, sag-resistant (i.e. non-sagging) adhesive compositions are described in, for example, U.S. Pat. Nos. 3,714,127, 3,979,364, 4,552,934, 4,743,672, 4,994,540, 5,164,473, 5,166,303 and 5,204,439.

The adhesives of U.S. Pat. No. 3,714,127 comprise a polyisocyanate-terminated prepolymer, a polyhydroxyl compound, and an aliphatic or aromatic primary amine. Preferred polyisocyanate prepolymers are based on aromatic isocyanates.

Adhesives of U.S. Pat. No. 3,979,364 comprise the reaction product of an organic compound containing unreacted isocyanate groups with a component comprising an amine terminated polyether, a polyether polyol, and optionally, catalysts, crosslinkers, stabilizers, etc. Although no particular type of isocyanate group containing compounds are specified, all of the working examples use polymethylene polyphenylisocyanate.

Two-component adhesives comprising a polyurethane prepolymer component and a curative component are described in U.S. Pat. No. 4,552,934. Polyurethane prepolymers are described as having 3 to 15% of NCO. The curative is a mixture of a relatively low equivalent weight compound containing hydroxyl groups with a polyamine, preferably a diamine.

U.S. Pat. No. 4,763,672 also describes two-component adhesives. These compositions comprise an isocyanate prepolymer and a curative component comprising a poly (alkylene oxide)polyamine and polyhydroxy components. Suitable polyamines include di-, tri- and higher functional amines having molecular weights of 400 to 10,000.

The sag-resistant adhesive compositions of U.S. Pat. No. 4,994,540 comprise a polyisocyanate, and a curative component comprising a polyol and an aromatic amine terminated polyether containing two or more primary amine groups and having molecular weights of from 250 to 15,000. The curative component may also contain low molecular weight aliphatic polyols and low molecular weight aliphatic diamines. Aromatic diisocyanates are preferred, although aliphatic diisocyanates are broadly disclosed. These compositions do not require the addition of fillers and prepolymerization of the isocyanate component.

U.S. Pat. Nos. 5,164,473 and 5,204,439 describe low-viscosity two-component filled polyurethane adhesives. The isocyanate component is a low-viscosity isocyanate which has been modified by reaction with at least one of the isocyanate-reactive compounds. The curative component also has a low-viscosity and comprises an aromatic amine terminated polyether, at least one diol chain extender and optionally other chain extenders/crosslinkers, and at least one isocyanate-reactive diamine or triamine. Fillers are also present in one of the two-components.

U.S. Pat. No. 5,166,303 discloses expandable non-sagging polyurethane compositions. These are prepared by mixing a liquid polyisocyanate having an NCO content of about 10 to 50%, and an isocyanate-reactive mixture comprising at least one compound containing 2 to 8 hydroxyl groups and having molecular weights of 1000 to 6000, at least one low molecular weight diols or triols, at least one organic diamine or polyamine, and a small quantity of water. Fillers are not required in these compositions.

The adhesive compositions of U.S. Pat. No. 4,954,199 comprise the reaction product of a compound having 2 or more hydroxy groups; an aromatic, aliphatic or cycloaliphatic diamine or triamine having a molecular weight of at least 60, a low molecular weight aliphatic polyol, and an organic isocyanate. Isocyanate prepolymers are outside the scope of suitable isocyanates.

U.S. Pat. No. 5,059,672 describes elastomeric reaction products of an aromatic isocyanate, an aliphatic isocyanate having a functionality of at least two, and an aromatic diamine. Suitable aromatic isocyanates include aromatic isocyanates, aromatic isocyanate terminated aliphatics, aromatic isocyanate terminated cycloaliphatics, aromatic isocyanate terminated quasi-prepolymers, and aromatic isocyanate terminated prepolymers. Suitable aliphatic isocyanates include isocyanate terminated aliphatics, cycloaliphatic isocyanates containing at least two isocyanate groups, isocyanate terminated quasi-prepolymers and isocyanate terminated prepolymers. Chain extenders, fillers, pigments, etc. may also be included.

Removable polyurethane adhesive compositions are disclosed by U.S. Pat. Nos. 5,102,714 and 5,227,409. These adhesives comprise the reaction product of a mixture of a monoalcohol and a polyol, a compound (or mixture thereof) having at least two-active hydrogen containing groups per molecule and equivalents of about 30 to 500, and an organic polyisocyanate or mixtures thereof having an average functionality of 2.2 or less. These adhesives can be applied to substrates with a backing layer over the adhesive for installation to a surface (such as a floor) at a later time. After installation, the adhesive coated substrate is removable from the surface without leaving a significant residual film. These adhesives are also washable with water or other substances which are non-solvents for polyurethanes without losing tackiness.

Polyurethane based reactive masses comprising at least one organic compound having a molecular weight of 400 to 12,000 and containing from about 2 to 8 hydroxyl groups, an aliphatic isocyanate compound, catalysts, and optionally low molecular weight isocyanate-reactive group containing compounds, and other additives are disclosed in U.S. Pat. No. 4,732,957. Hexamethylene diisocyanate, hydrogenated diphenylmethane diisocyanate and isophorone diisocyanate containing isocyanurate, uretdione, urethane, uretonimine, oxadiazatrione, and/or biuret groups are suitable isocyanates. The reactive masses of this reference are suitable for coating surfaces, particularly surfaces and/or edges of wood or wood by-products.

U.S. Pat. No. 4,869,400 describes a system for dispensing a two-part urethane polymer composition. These two-part polyurethanes comprise a first component of an aliphatic isocyanate prepolymer, a polyol and an aromatic isocyanate, and a second component of a polyol and two amines having different reactive rates with respect to the aromatic isocyanate of the first component. These two amines are an aromatic primary or secondary amine chain extender and an aliphatic primary or secondary aliphatic amine.

Although non-sagging polyurethanes are disclosed in various patents, none of the described formulations result in light stable polyurethanes. Previously, non-sagging characteristics of polyurethanes have been attained by using either a blend of aromatic and aliphatic isocyanates or amines, or aromatic amines and polyols. The combination of aromatic amines and polyols has typically been used with polymeric MDI. However, the present invention provides polyurethanes which are both non-sagging and light stable.

DESCRIPTION OF THE INVENTION

The present invention relates to non-sagging, light stable polyurethane compositions. These non-sagging, light stable polyurethane compositions comprise the reaction product of a liquid hexamethylene diisocyanate adduct and an isocyanate-reactive component comprising an organic compound containing hydroxyl groups, an aliphatic and/or alicyclic diamine, and an alkanolamine.

More specifically, these non-sagging, light stable polyurethanes comprise the reaction product of a) a liquid hexamethylene diisocyanate adduct having a functionality of at least 2.5, an NCO group content of 12 to 25% by weight, a viscosity of at least 50 mPa.s, but no more than 20,000 mPa.s at 25° C., and a monomeric diisocyanate content of less than 1% by weight, and being modified by the presence of one or more uretdione groups, isocyanurate groups, allophanate groups, biuret groups, or mixtures thereof; and b) an isocyanate-reactive component comprising
   i) from 70 to 96% by weight, based on the total weight of component b), of at least one organic compound containing hydroxyl groups, and having a functionality of from 2 to 4, and a molecular weight of from 400 to 4,000,
   ii) from 2 to 15% by weight, based on the total weight of component b), of at least one aliphatic or alicyclic diamine having a molecular weight of from 60 to 300 and being selected from the group consisting of primary diamines, secondary diamines and mixtures thereof, and
   iii) from 2 to 15% by weight, based on the total weight of component b), of at least one alkanolamine having a molecular weight of from 61 to 300 and corresponding to the general formula:

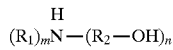

wherein:
R$_1$ represents a hydrogen atom, or an alkyl group containing from 1 to 4 carbon atoms,
R$_2$ represents an alkylene group containing from 2 to 30 carbon atoms which can be linked by ether groups,
m represents 0 or 1,
n represents 1 or 2,
and
m+n equals 2,
with the proviso that at least 10 equivalent percent of the isocyanate-reactive hydrogen in said isocyanate-reactive component are present in the form of amino groups being derived from said alkanolamine and diamine components.

The present invention relates to a process for the preparation of these non-sagging light stable polyurethane compositions and their use as seam sealants.

In a preferred embodiment of the present invention, the liquid hexamethylene diisocyanate adduct has an NCO content of 17–24% by weight and a viscosity of at least 50 mPa.s, but no more than 5,000 mPa.s at 25° C. The functionality of the HDI adduct is preferably 2.5 to 3.5. It is also preferred that this liquid HDI adduct contains biuret or isocyanurate groups.

It is preferred that the isocyanate-reactive component comprise i) from 84 to 96% by weight of at least one organic compound containing hydroxyl groups, having a functionality of 2 to 3 and a molecular weight of from 500 to 2,000, ii) from 2 to 10% by weight of at least one aliphatic or alicyclic diamine having a molecular weight of from 100 to 250, and iii) from 2 to 6% by weight of at least one alkanolamine having a molecular weight of from 70 to 200. Also at least 10 equivalent percent, more preferably 20 equivalent percent of the isocyanate-reactive hydrogen in the isocyanate-reactive component are present in the form of amino groups being derived from the alkanolamine and the diamine components.

In accordance with the present invention, suitable isocyanates are aliphatic polyisocyanate components having a viscosity of at least 50 mPa.s but no more than about 20,000 mPa.s at 25° C. with an average NCO functionality of 2.3 to 4.0, generally in the form of an NCO prepolymer or a polyisocyanate adduct, more preferably a polyisocyanate adduct. Suitable polyisocyanate adducts for the present invention are based on 1,6-hexamethylene diisocyanate.

Suitable polyisocyanate adducts containing biuret groups include polyisocyanates such as those described, for example, in U.S. Pat. Nos. 3,124,605, 3,358,010, 3,644,490, 3,862,973, 3,906,126, 3,903,127, 4,051,165, 4,147,714, and 4,220,749, the disclosures of which are herein incorporated by reference. As set forth in these patents, these biuret group-containing polyisocyanates may be prepared by using co-reactants such as water, tertiary alcohols, primary and secondary monoamines, and primary and/or secondary diamines. These polyisocyanates preferably have an NCO content of about 18 to 23% by weight and an average NCO functionality of 2.3 to 4.0, preferably of 3 to 3.5.

Suitable polyisocyanates containing isocyanurate groups include compounds such as those described, for example, in U.S. Pat. Nos. 4,288,586 and 4,324,879, the disclosures of which are herein incorporated by reference; European Patents 3,765, 10,589 and 47,452, the disclosures of which are herein incorporated by reference; and German Offenlegungsschrift 2,616,416, herein incorporated by reference. The isocyanato-isocyanurates generally have an average NCO functionality of 2.3 to 4.0, preferably of 3 to 3.5, and an NCO content of 5 to 30%, preferably 10 to 25% and most preferably 15 to 25% by weight.

Uretdione diisocyanates may be prepared by oligomerizing a portion of the isocyanate groups of a diisocyanate in the presence of a trialkyl phosphine catalyst, and may be used in admixture with other aliphatic and/or cycloaliphatic polyisocyanates, particularly the isocyanurate group-containing polyisocyanates described hereinabove.

Urethane group-containing polyisocyanates which may be prepared in accordance with the process disclosed in U.S. Pat. No. 3,183,112, herein incorporated by reference, by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof.

Allophanate group-containing polyisocyanates include, for example, those prepared according to the processes disclosed in U.S. Pat. Nos. 3,769,318, 4,160,080 and 4,177,342, the disclosures of which are herein incorporated by reference.

Isocyanurate and allophanate group-containing polyisocyanates include, for example, those which may be prepared in accordance with the processes set forth in U.S. Pat. Nos. 5,124,427, 5,208,334 and 5,235,018; the disclosures of which are herein incorporated by reference. These polyisocyanates containing isocyanurate and allophanate groups preferably have an NCO content of 16 to 22% by weight, most preferably of 18 to 21% by weight.

Suitable carbodiimide group-containing and uretone imine group-containing polyisocyanates for the present invention include, for example, those which may be prepared by oligomerizing di- or polyisocyanates in the presence of known carbodiimidization catalysts such as described in, for example, German Patentschriften 1,092,007, herein incorporated by reference, U.S. Pat. No. 3,152,162, herein incorporated by reference, and German Offenlegungschriften 2,504,400, 2,537,685 and 2,552,350, the disclosures of which are herein incorporated by reference.

It is also possible to use polyisocyanates containing oxadiazine-trione groups and containing the reaction product of two moles of a diisocyanate and one mole of carbon dioxide.

The most preferred polyisocyanates include those which contain isocyanurate groups, and/or biuret groups. Of these, the most preferred polyisocyanate containing isocyanurate groups is prepared from 1,6-hexamethylene diisocyanate and has an isocyanate content of 21.6%, a content of monomeric diisocyanate of <0.2% and a viscosity at 20° C. of 3000 mPa.s.

The most preferred biuret group containing polyisocyanates include 1) those prepared from 1,6-hexamethylene diisocyanate and having an isocyanate content of about 23%, a content of monomeric diisocyanate of <0.7% and a viscosity at 25° C. of 1300–2200 mPa.s, and 2) those prepared from 1,6-hexamethylene diisocyanate and having an isocyanate content of about 22%, a content of monomeric diisocyanate of <0.7% and a viscosity at 25° C. of 5000–10,000 mPa.s. Suitable biuret group-containing polyisocyanates include polyisocyanates such as those described, for example, in U.S. Pat. No. 3,903,127, herein incorporated by reference.

Suitable isocyanates according to the invention can also be prepolymerized by reaction of some of the isocyanate groups with alcohols or polyols to yield the urethane group containing prepolymer prior to reaction with component b). Suitable polyols for preparation of the prepolymers include alcohols or mono- or di-functional polyethers. The viscosity of these prepolymers, however, should not exceed 20,000 mPa.s. These polyols preferably have a molecular weight of from about 32 to 4,000.

Suitable organic compounds containing hydroxyl groups for the isocyanate-reactive component b)i) include, for example, those compounds containing from 2 to 4 hydroxyl groups and having molecular weights of from 400 to 4000, preferably 500 to 2000. Some examples of suitable compounds to be used as component b)i) include the polyethers, polyesters, polythioethers, polyacetals, and polycarbonates.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, BF$_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, sucrose, aniline, ammonia, ethanolamine and ethylene diamine.

Polyether polyols are preferably used as component b)i) in the invention. Preferred polyethers include, for example, those compounds based on di- or tri-functional starters such as, for example, water, ethylene glycol, propylene glycol, glycerin, trimethylolpropane, or triethanolamine. The preferred compounds are polymers prepared from propylene oxide and include polyoxypropylene polyols. Most preferred are the polyoxypropylene diols.

Suitable examples of high molecular weight polyesters include, for example, the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above-identified U.S. Pat. Nos. Finally, representatives of the many and varied compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

In another embodiment, the polyhydroxyl compound b)i) may additionally comprise: 1) a dispersion of a polyurea and/or polyhydrazo-dicarbonamide in a relatively high molecular weight organic compound containing at least two hydroxyl groups, 2) a polymer polyol prepared by polymerizing an ethylenically unsaturated monomer or monomers in a relatively high molecular weight organic compound containing at least two hydroxyl groups, or 3) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Arco.

The preferred PHD polyols include, for example, the polyurea of toluene diisocyanate and hydrazine dispersed in polyether polyol, and the preferred polymer polyols include, for example, those based on the monomers styrene and acrylonitrile.

Suitable aliphatic or alicyclic diamines to be used as isocyanate-reactive components b)ii) of the present invention include, for example, those compounds having a molecular weight of less than about 300, preferably of 100 to 250, and which contain two primary and/or secondary amino groups. The amino groups may be aliphatically-, or cycloaliphatically-bound.

Some examples of suitable diamines include ethylene diamine, 1,3-propane diamine, 1,4-butane diamine, 2-methyl-pentamethylene diamine, N,N' dimethyl-ethylene diamine, 1,6-hexane diamine, piperazine, 2,5-dimethyl piperazine, I-amino-3-aminomethyl-3,5,5-trimethyl-cyclohexane (isophorone diamine), bis-(4-aminocyclohexyl)-methane, bis(4-amino-3-methylcyclohexyl)-methane, 1,2 and 1,4-cyclohexane-diamine, 1,2-propane diamine, hydrazine, bis-hydrazides, bis-semicarbazides, polyethylene imines, iminobispropylamine, N-(2-aminoethyl)-1,3-propane diamine, polyoxypropylene amines.

Preferred diamines include bis-(4-aminocyclohexyl)-methane, bis-(4-amino-3-methylcyclohexyl)-methane, and 1-amino-3-amino methyl-3,5,5-trimethyl cyclohexane (isophorone diamine).

Suitable alkanolamines include those which correspond to the formula

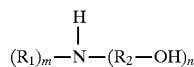

wherein
R₁ represents a hydrogen atom or an alkyl group containing from 1 to 4 carbon atoms,
R₂ represents an alkylene group containing from 2 to 30 carbon atoms which can be linked by ether groups,
m represents 0 or 1,
n represents 1 or 2 and
m+n equals 2.
Examples of suitable monoamines include ethanolamine, propanolamine, butanolamine, N-methylethanolamine, N-ethyl-ethanolamine, N-propylethanolamine, N-butylethanolamine, N-methyl-propanolamine, N-ethyl-propanolamine, N- propylpropanolamine, N-butyl-propanolamine, N-methylbutanolamine, N-ethyl-butanolamine, N-propyl-butanolamine, N-ethyl-butanolamine, N-propylbutanolamine, N-butyl-butanolamine, diethanolamine, dipropanolamine, dibutanolamine, and N-ethanol-N-propanolamine. Suitable compound containing hydroxyl and amino groups include also propoxylated p-alpha-aminoethyl phenols. N-methylethanol-amine and N-ethylethanolamine are especially preferred. The preferred compounds include ethanolamine and N-alkyl substituted ethanolamines.

In addition, the polyurethane compositions of the present invention may comprise additives such as, for example, catalysts, fillers and reinforcing agents, stabilizers, antioxidants, plasticizers, adhesion promoters, dyes, etc. Useful fillers include materials such as, for example, calcium carbonate, alumina trihydrate, titanium dioxide, iron oxide, barium sulfate, etc. In general, fillers are usually used in quantities of from about 20 to 300 parts per 100 parts of the polyol mixture. Suitable antioxidants include, for example, Irganox 245, and suitable UV stabilizers include, for example, Tinuvin 765. However, any of the known antioxidants and/or UV stabilizers may be used. As set forth hereinabove, specific advantages have been found in reaction mixtures containing antioxidants and/or UV stabilizers.

Suitable catalysts to be used in the present invention include organometallic catalysts. The preferred catalysts are the tin catalysts.

Some examples of suitable organometallic catalysts include, for example, organometallic compounds of tin, lead, iron, bismuth, mercury, nickel, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di-(2-ethylhexyl)tin oxide, etc. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis (isooctylmercaptoacetate), and di(isooctyl)tin bis (isooctylmer-captoacetate), all of which are commercially available from Witco Chemical Corp., are especially preferred. The use of a delayed action catalyst such as an iron pentanedione or a bismuth carboxylate, as described in U.S. Pat. No. 4,611,044, herein incorporated by reference, is also possible. The use of a delayed action catalyst such as nickel acetylacetonate, as described in, for example, U.S. Pat. Nos. 3,772,224 and 3,849,156, the disclosures of which are herein incorporated by reference, is also possible.

Organometallic catalysts are usually used in amounts ranging from about 0.01% to about 2.0%, preferably about 0.05% to 0.5% per 100 parts of isocyanate-reactive material. It is most preferred that the catalysts be used in quantities such that they comprise less than 1.0% by weight, preferably less than 0.5% by weight of the total composition.

The process of producing these non-sagging, light stable polyurethane compositions comprises the steps of first premixing the polyol, the aliphatic or alicyclic diamine, and the alkanolamine. Subsequently, this polyol/amine blend is combined with the poly-isocyanate at an NCO:OH ratio of about 1.0 to 1.2. Mixing can be achieved by either 1)

kneading the composition in a plastic bag for about 1–2 minutes, cutting off a corner of the bag and squeezing out a non-sagging bead, or 2) placing both components in cartridges of a two component caulking gun and mixing the components using a static mixer in the tip of the caulking gun. Again, the material squeezed out of the caulking gun forms a non-sagging bead. Depending on the amount of catalyst used, the non-sagging polyurethane composition has a worklife of 10 minutes to about 1 hour, after which it starts to solidify. It cures to form a tough elastomeric polyurethane within 24 hours.

Seam sealants, i.e. in carpet installation, may be produced from the non-sagging, light stable polyurethane compositions of the present invention. These seam sealants are produced by generating a non-sagging polyurethane composition using either a two component mixing/metering machine pumping the components at the correct NCO:OH ratio through a mixhead or using any of the above described manual mixing methods. The non-sagging bead is subsequently applied to the floor where two or more pieces of carpet are joined together. Pushing the carpet edges down, the non-sagging polyurethane composition is squeezed underneath the adjoining carpet and in the seams where it cures to form a strong elastomeric bond between the carpet pieces and at the same time glues the carpet to the floor.

Preferably, the equivalent weight of the amine/polyol blend and the polyisocyanate are adjusted so that they can be metered 1:1 by volume within the preferred index range. Since the equivalent weight and the amounts are usually measured in grams and the volume is given in cm$^3$ or ml, the density of the components has to be considered in the formulation.

The compositions according to the present invention may be produced using conventional processing techniques at isocyanate indexes ranging from about 80 to 130 (preferably from 90 to 115). The term "Isocyanate Index" (also commonly referred to as NCO index), is defined herein as the equivalents of isocyanate, divided by the total equivalents of isocyanate-reactive hydrogen containing materials, multiplied by 100.

The following examples further illustrate details for the preparation and use of the compositions of this invention and the process of producing these compositions. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the examples.

Polyisocyanate A: an isocyanurate group containing polyisocyanate having an equivalent weight of 194, a viscosity of 2,100 mPa.s at 23° C. and having an isocyanate content of 21.6%, a content of monomeric 1,6-hexamethylene diisocyanate of less than 0.2%, and prepared by trimerizing 1,6-hexamethylene diisocyanate.

Polyisocyanate B: 3440 parts of Polyisocyanate A were combined with 860 parts of Polyol D under a dry nitrogen atmosphere. The mixture was agitated at 80°–85° C. for 7 hours and then cooled to ambient temperature. The resulting urethane group containing polyisocyanate had an equivalent weight of 247 (an NCO-content of 17.0%), a viscosity of 2,700 mPa.s, and a density of 1.147 g/cm$^3$ at 25° C.

Polyol A: a propylene glycol started, propoxylated polyether, having a functionality of 2, an equivalent weight of 1000 and an OH number of 56.

Polyol B: a propoxylated Bisphenol A, having a functionality of 2, an equivalent weight of 275 and an OH number of 204.

Bisphenol A: 2,2 bis(4-hydroxyphenyl) propane.

Polyol C: a propylene glycol started, propoxylated polyether, having a functionality of 2, an equivalent weight of 500 and an OH number of 112.

Polyol D: a polyether monohydric alcohol having a functionality of 1, an OH number of 25 and being prepared from n-butanol, ethylene oxide and propylene oxide (molar ratio of EO to PO=83:17)

Amine A: bis-(4-amino-3-methylcyclohexyl)methane, equivalent weight 119.

Amine B: methylethanolamine, equivalent weight 37.5.

Amine C: diethanolamine, equivalent weight 35.

Amine D: amino terminated polyoxypropylene glycol, having a functionality of 2, an equivalent weight of 1,000 and an NH number of 56 (commercially available as Jeffamine D2000 from Huntsman Chemical).

Amine E: amino terminated polyoxypropylene glycol, having a functionality of 2, an equivalent weight of 200 and an NH number of 280 (commercially available as Jeffamine D400 from Huntsman Chemical).

Example 1

A polyol/amine blend was prepared by mixing 18 parts of Amine B, 38.1 parts of Amine A, 140 parts of Polyol A, 291.5 parts of Polyol B and 5 parts of a 10% solution of dimethyl tin dilaurate in Polyol A as the catalyst. The polyol/amine blend had a viscosity of 2,400 mPa.s at 25° C. This polyol/amine blend contained 28 equivalent percent of the isocyanate reactive hydrogens in the form of amino groups derived from the alkanolamine and the diamine components (based on the total quantity of isocyanate-reactive hydrogen in the isocyanate-reactive component).

A 200 cm$^3$ cartridge of a two-component caulking gun was filled with the polyol/amine mixture while the other 200 cm$^3$ cartridge was filled with Polyisocyanate B. The polyol/amine mixture had a density at 25° C. of 1.037 g/cm$^3$ and an average equivalent weight of 245.7. Polyisocyanate B had a density at 25° C. of 1.147 g/cm$^3$ and an equivalent weight of 247. Mixing the two components at a 1:1 ratio therefore resulted in an Isocyanate Index of 110.

Mixing of the isocyanate and polyol/amine blend was achieved by a static mixer attached to the tip of the caulking gun. The static mixer was 18 cm long and 1 cm in diameter. The two components were combined at the beginning of the tip and squeezed through the static mixer by squeezing the trigger of the caulking gun which caused the two plungers to push the materials at even volumes through the tip.

A bead of the non-sagging polyurethane was squeezed onto a polyethylene film and two pieces of carpet (approximately 12×12 inches) were bonded together by placing them on the non-sagging seam sealant. After 24 hours at ambient temperature the carpet was lifted from the polyethylene film. The seam sealant had cured to provide a tough, flexible bondline between the two pieces of carpet with excellent tuft-strength (no fibers could be pulled out of the carpet at the bond line).

The cured polyurethane had a tensile strength of 1,002 psi, an elongation of 60%, a Die C tear strength of 88.5 lb/in, and a split tear strength of 19.4 lb/in.

A bead of the same material was squeezed onto a metal panel and after 24 hours cure, exposed for 6 months to sunlight behind a southside window. The polyurethane showed no discoloration.

Example 2

A polyol/amine blend was prepared by mixing 18 parts of Amine B, 28.6 parts of Amine A, 120 parts of Polyol A, 319 parts of Polyol B, 6.2 parts of a 10% solution of dimethyl tin dilaurate in Polyol A, and 13.1 g fumed silica. The polyol/amine blend contained 24 equivalent percent of the isocyanate reactive hydrogen in the form of amino groups derived from the alkanolamine and the diamine components (based on the total quantity of isocyanate-reactive hydrogen in the isocyanate-reactive component).

The polyol/amine blend had an average equivalent weight of 251.7, and a density at 25° C. of 1.040 g/cm$^3$. Polyisocyanate B had a density at 25° C. of 1.147 g/cm$^3$. Mixing the two components at a 1:1 ratio therefore resulted in an Isocyanate Index of 110.

This polyol/amine blend and Polyisocyanate B were filled in cartridges and mixed using the two component caulking gun as described in Example 1. The resulting polyurethane/urea bead had better non-sagging properties but due to the high viscosity of the mixture it was much more difficult to squeeze the material through the static mixer. The non-sagging light stable polyurethane composition showed excellent adhesion to the polyurethane foam backed carpet samples, performed well as a seam sealant, and also as an adhesive to glue the carpet to a plywood substrate.

Example 3

A polyol/amine blend was prepared by mixing 22 parts of Amine C, 38 parts of Amine A, 250 parts of Polyol C, 689 parts of Polyol B, and 15.7 parts of a 10% solution of dimethyl tin dilaurate in Polyol A. The polyol/amine blend contained 13.3 equivalent percent of the isocyanate reactive hydrogen in the form of amino groups derived from the alkanolamine and the diamine components (based on the total quantity of isocyanate-reactive hydrogen in the isocyanate-reactive component).

10 g each of the polyovamine blend (having an average equivalent weight of 256) described above and 10 g of Polyisocyanate B (Isocyanate Index=100) were placed in a small plastic bag, the bag was closed in a way that no air bubbles remained inside and the composition was mixed by kneading for about 2 minutes. A corner of the plastic bag was cut off and a bead of the material was squeezed onto a metal panel. The non-sagging polyurethane was smooth, homogeneous, and had a worklife of about 22 minutes after which it started to solidify and lose its tackiness.

Example 4: (Comparison Example)

A polyol/amine blend was prepared by mixing 55 parts of Amine A, 250 parts of Polyol C, 689 parts of Polyol B, and 15.7 parts of a 10% solution of dimethyl tin dilaurate in Polyol A. The polyol/amine blend has an average equivalent weight of 291 and contained 13.3 equivalent percent of the isocyanate reactive hydrogen in the form of amino groups derived from the diamine component (based on the total quantity of isocyanate-reactive hydrogen in the isocyanate-reactive component).

10.10 g of the polyol/amine blend described above and 8.77 g of Polyisocyanate B (amount was adjusted to achieve the same Isocyanate Index as in Example 3) were placed in a small plastic bag. The bag was closed in a way that no air bubbles remained inside and the composition was mixed by kneading for about 2 minutes. A corner of the plastic bag was cut off and a bead of the material was squeezed onto a metal panel. The resulting polyurethane/urea composition was non-sagging, but was inhomogeneous (lumpy and grainy). The work life was about 25–30 minutes after which it started to solidify and lose its tackiness.

Example 5: (Comparison Example)

A polyol/amine blend was prepared by mixing 92 parts of Amine E, 250 parts of Polyol C, 689 parts of Polyol B, and 15.7 parts of a 10% solution of dimethyl tin dilaurate in Polyol A. The polyol/amine blend had an average equivalent weight of 302 and contained 13.3 equivalent percent of the isocyanate reactive hydrogen in the form of amino groups derived from the diamine component (based on the total quantity of isocyanate-reactive hydrogen in the isocyanate-reactive component).

10.47 g of the polyol/amine blend described above and 8.77 g of Polyisocyanate B (amount was adjusted to achieve the same Isocyanate Index as in Example 3) were placed in a small plastic bag. The bag was closed in a way that no air bubbles remained inside and the composition was mixed by kneading for about 2 minutes. A corner of the plastic bag was cut off and a bead of the material was squeezed onto a metal panel. The resulting polyurethane/urea composition was non-sagging, but was inhomogeneous (lumpy and grainy). The work life was about 25–30 minutes after which it started to solidify and lose its tackiness.

Example 6: (Comparison Example)

A polyol/amine blend was prepared by mixing 70 parts of Amine C, 250 parts of Polyol C, 689 parts of Polyol B, and 15.7 parts of a 10% solution of dimethyl tin dilaurate in Polyol A. The polyol/amine blend had an average equivalent weight of 205 and contained 13.3 equivalent percent of the isocyanate reactive hydrogen in the form of amino groups derived from the alkanolamine component (based on the total quantity of isocyanate-reactive hydrogen in the isocyanate-reactive component).

10.25 g of the polyol/amine blend described above and 12.65 g of Polyisocyanate B (amount was adjusted to achieve the same Isocyanate Index as in Example 3) were placed in a small plastic bag. The bag was closed in a way that no air bubbles remained inside and the composition was mixed by kneading for about 2 minutes. A corner of the plastic bag was cut off and a bead of the material was squeezed onto a metal panel. The resulting polyurethane/urea composition was a viscous liquid with no non-sagging properties. The work life was about 25–30 minutes after which it started to solidify and lose its tackiness.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non-sagging, light stable polyurethane composition comprising the reaction product of:

a) a liquid hexamethylene diisocyanate adduct having a functionality of at least 2.5, an NCO group content of 12 to 25% by weight, a viscosity of at least 50 mPa.s and no more than 20,000 mPa.s at 25° C., and a monomeric diisocyanate content of less than 1% by weight, and being modified by the presence of one or more uretdione groups, isocyanurate groups, allophanate groups, biuret groups, or mixtures thereof; and b) an isocyanate-reactive component comprising
   i) from 70 to 96% by weight, based on the weight of component b), of at least one organic compound containing hydroxyl groups, and having a functionality of from 2 to 4, and a molecular weight of from 400 to 4,000,
   ii) from 2 to 15% by weight, based on the weight of component b), of at least one aliphatic or alicyclic diamine having a molecular weight of from 60 to 300 and being selected from the group consisting of primary diamines, secondary diamines and mixtures thereof, and
   iii) from 2 to 15% by weight, based on the weight of component b), of at least one alkanolamine having a molecular weight of from 61 to 300 and corresponding to the general formula:

$$(R_1)_m \quad \underset{\mathrm{H}}{\mathrm{N}} - (R_2-OH)_n$$

wherein:
   $R_1$ represents a hydrogen atom or an alkyl group containing from 1 to 4 carbon atoms,
   $R_2$ represents an alkylene group containing from 2 to 30 carbon atoms which can be linked by ether groups
   m represents 0 or 1,
   n represents 1 or 2, and
   m+n equals 2;
with the proviso that at least 10 equivalents of the isocyanate-reactive hydrogen in said isocyanate-reactive component are present in the form of amino groups being derived from said alkanolamine and diamine components.

2. The non-sagging polyurethane composition of claim 1 wherein said organic compound containing hydroxyl groups is a polyether polyol prepared from propylene oxide.

3. The non-sagging polyurethane composition of claim 1, wherein said liquid hexamethylene diisocyanate adduct is reacted with said isocyanate-reactive component in the presence of a catalyst.

4. The non-sagging polyurethane composition of Claim 3, wherein said catalyst is a tin catalyst.

5. The non-sagging polyurethane composition of claim 1, wherein said liquid hexamethylene diisocyanate adduct is reacted with said isocyanate-reactive component in a volume of 1:1.

6. A process for the production of a non-sagging light stable polyurethane composition by reacting
   a) a liquid hexamethylene diisocyanate adduct having a functionality of at least 2.5, an NCO group content of 12 to 25% by weight, a viscosity of at least 50 mPa.s and no more than 20,000 mPa.s at 25° C., and a monomeric diisocyanate content of less than 1% by weight, and being modified by the presence of one or more uretdione groups, isocyanurate groups, allophanate groups, biuret groups, or mixtures thereof; with
   b) an isocyanate-reactive component comprising
      i) from 70 to 96% by weight, based on the weight of component b), of at least one organic compound containing hydroxyl groups, and having a functionality of from 2 to 4, and a molecular weight of from 400 to 4,000,
      ii) from 2 to 15% by weight, based on the weight of component b), of at least one aliphatic or alicyclic diamine having a molecular weight of from 60 to 300 and being selected from the group consisting of primary diamines, secondary diamines and mixtures thereof, and
      iii) from 2 to 15% by weight, based on the weight of component b), of at least one alkanolamine having a molecular weight of from 61 to 300 and corresponding to the general formula:

$$(R_1)_m\mathrm{N} - (R_2-OH)_n$$

wherein:
   $R_1$ represents a hydrogen atom or an alkyl group containing from 1 to 4 carbon atoms,
   $R_2$ represents an alkylene group containing from 2 to 30 carbon atoms which can be linked by ether groups
   m represents 0 or 1,
   n represents 1 or 2,
   and
   m+n equals 2;
with the proviso that at least 10 equivalents of the isocyanate-reactive hydrogen in said isocyanate-reactive component are present in the form of amino groups being derived from said alkanolamine and diamine components, and allowing the components to react fully.

7. The process of claim 6, wherein said organic compound containing hydroxyl groups is a polyether polyol prepared from propylene oxide.

8. The process of claim 6, wherein said liquid hexamethylene diisocyanate adduct is reacted with said isocyanate-reactive component in the presence of a catalyst.

9. The process of claim 8, wherein said catalyst is a tin catalyst.

10. The process of claim 6, wherein said liquid hexamethylene diisocyanate adduct is reacted with said isocyanate-reactive component in a volume of 1:1.

11. A non-sagging, light stable seam sealant for carpets produced by the process of claim 6.

* * * * *